US006992975B1

(12) United States Patent
Daniel et al.

(10) Patent No.: US 6,992,975 B1
(45) Date of Patent: Jan. 31, 2006

(54) MULTIPLE RING SUPPORT WITHIN A SINGLE NETWORK ELEMENT

(75) Inventors: Philippe Daniel, Petaluma, CA (US); Paul Elliott, Jenner, CA (US); Keith Neuendorff, Petaluma, CA (US); Phu Le, Rohnert Park, CA (US); Xiaopin Nie, Petaluma, CA (US); Brian Rushka, Santa Rosa, CA (US)

(73) Assignee: Cisco Technology, Inc., San Jose, CA (US)

( * ) Notice: Subject to any disclaimer, the term of this patent is extended or adjusted under 35 U.S.C. 154(b) by 736 days.

(21) Appl. No.: 09/639,396

(22) Filed: Aug. 15, 2000

(51) Int. Cl.
*H04L 12/26* (2006.01)

(52) U.S. Cl. ...................... 370/222; 370/221; 370/223; 370/224

(58) Field of Classification Search ................ 370/403, 370/242, 406, 216–228; 359/119; 398/4
See application file for complete search history.

(56) References Cited

U.S. PATENT DOCUMENTS

| | | | | |
|---|---|---|---|---|
| 5,440,540 | A * | 8/1995 | Kremer | 370/223 |
| 5,442,623 | A * | 8/1995 | Wu | 370/224 |
| 5,661,720 | A * | 8/1997 | Taniguchi | 370/223 |
| 6,002,683 | A * | 12/1999 | Madonna | 370/353 |
| 6,122,250 | A * | 9/2000 | Taniguchi | 370/222 |
| 6,226,111 | B1 * | 5/2001 | Chang et al. | 398/9 |
| 6,295,146 | B1 * | 9/2001 | Nathan et al. | 398/50 |
| 6,532,238 | B1 * | 3/2003 | Lecoutre et al. | 370/403 |
| 6,587,470 | B1 | 7/2003 | Elliot et al. | 370/404 |
| 6,614,785 | B1 | 9/2003 | Huai et al. | 370/352 |
| 6,616,349 | B1 * | 9/2003 | Li et al. | 398/4 |
| 6,639,896 | B1 * | 10/2003 | Goode et al. | 370/224 |
| 6,654,341 | B1 * | 11/2003 | Chi et al. | 370/216 |
| 6,657,969 | B1 * | 12/2003 | Neuendorff et al. | 370/245 |
| 6,775,477 | B2 * | 8/2004 | Badr | 398/1 |
| 2003/0179702 | A1 * | 9/2003 | Chi et al. | 370/218 |

OTHER PUBLICATIONS

Goralski, W., *SONET: A Guide to Synchronous Optical Network*, McGraw-Hill 1997, Chapter 9, pp. 251-276.

Hari, G. and Dempsey, D., "Requirements for Bidirectional Line Switched Ring Map Generation Protocol," SONET Interoperability Forum (SIF), Contribution No. SIF-AR-9807-111, draft document, Jul. 27, 1998, pp. 1-5.

Henderson, J., "Questions on Autodiscovery of Ring Topology (SIF-AR-9804-057R2)," SONET Interoperability Forum (SIF), Contribution No. SIF-AR-9812-194, Dec. 1998, 4 pages.

Hunt, C., "BLSR Interworking—Autodiscovery of Ring Topology," SONET Interoperability Forum (SIF), Contribution No. SIF-AR-9804-057R1, draft document, Jun. 16, 1998, pp. 1-12.

Hunt, C., "BLSR Interworking—Autodiscovery of Ring Topology," SONET Interoperability Forum (SIF), Contribution No. SIF-AR-9804-057R2, draft document, Oct. 6, 1998, pp. 1-18.

(Continued)

*Primary Examiner*—Frank Duong
*Assistant Examiner*—Michael J. Moore
(74) *Attorney, Agent, or Firm*—Campbell Stephenson Ascolese LLP

(57) ABSTRACT

A network element receives frames from multiple ring networks. Each ring network linked to the network element is supported by a designated support program. The received frames are monitored for conditions indicative of a failure in one of the ring networks. Upon detection of a failure condition, the designated support program for the failing ring network is determined and notified. The designated support program then addresses the failure condition by, for example, switching to a backup link. In one example, the multiple ring networks are SONET BLSR networks.

29 Claims, 7 Drawing Sheets

OTHER PUBLICATIONS

Hunt, C., "BLSR Interworking—Autodiscovery of Ring Topology," SONET Interoperability Forum (SIF), Contribution No. SIF-AR-9804-057R3, draft document, Feb. 7, 1999, pp. 1-26.

Walsh, A., "Network Level Protection Glossary," SONET Interoperability Forum (SIF), Contribution No. SIF-IM-9805-082, May 28, 1998, pp. 1-7.

Wirbel, L., "Cerent offers a hybrid Sonet," *EE Times Online*, Feb. 17, 1999, (http://www.eetimes.com/story/OEG19990217S0028) (May 3, 1999), 2 pages.

Wu, L., "BLSR Interoperability Requirements—Cross Connect, Squelch Table and NUT," SONET Interoperability Forum (SIF), Contribution No. SIF-AR-9806-085, draft document, Mar. 28, 1998, pp. 1-10.

About the Cerent 454, Cerent Corporation Web Site (http://www.cerent.com/products/cerent454.cfm), (Mar. 4, 1999), 2 pages.

Fujitsu FLM 2400 ADM Lighweight Multiplexer, Fujitsu Business Communication Systems Web Site (http://www.fbcs.com/products/sonet/2400adm.asp), (Apr. 7, 1999), 3 pages.

* cited by examiner

MULTIPLE RING SUPPORT WITHIN A SINGLE NETWORK ELEMENT

BACKGROUND OF THE INVENTION

1. Field of the Invention

This invention generally relates to telecommunications networks and more specifically to network elements in ring networks.

2. Description of the Related Art

The arrangement of network elements in a telecommunications network is known as "topology". In Synchronous Optical Network (SONET), for example, network elements can be arranged in a ring or a linear topology. Network elements in a linear topology are arranged along a line, whereas in a ring topology the network elements are arranged in a circular fashion.

SONET is well known and described in the following documents: American National Standards Institute ("ANSI") documents ANSI T1.105, ANSI T1.105.01, ANSI T1.105.02, ANSI T1.105.03, ANSI T1.105.04, ANSI T1.105.05, ANSI T1.105.06, ANSI T1.105.07, ANSI T1.105.08, and ANSI T1.105.09; Bellcore Standards GR-253-CORE (Issue 2, December 1995), GR-1230-CORE (Issue 4, December 1998), GR-1375-ILR (Issue 1A Revision 1, August 1995), GR-1400-CORE (Issue 1, March 1994, Revision 1, October 1995), and TR-NWT-000496 (Issue 3, May 1992); see also, W. J. Goralski, "SONET: A guide to Synchronous Optical Networks," McGraw-Hill 1997. All of the aforementioned SONET documents are incorporated herein by reference in their entirety.

SONET specifications provide for a number of self-healing optical ring topologies including the Unidirectional Path Switched Ring (UPSR) and the Bidirectional Line Switched Ring (BLSR), both of which are well known. In a UPSR ring, the originating network element transmits duplicate SONET frames on two communications links. The receiving network element receives the frames from both links and, depending on the quality of the received signals representing the frames, uses the frame from one of the links. The receiving network element does not have to notify the transmitting network element if one of the links is locally detected to be defective.

In a BLSR ring, the SONET frames are transmitted by the originating network element on a working link. When the receiving network element detects that the working link is defective, it so informs the transmitting network element and initiates a switchover to a protect (i.e. back up) link. Coordination between network elements in switching to a protect link is performed using a signaling protocol which uses overhead bytes of the SONET frames.

It is desirable to have a single network element that can support multiple rings. The flexibility afforded by such a network element reduces the cost of the network and simplifies the interconnection of rings.

SUMMARY

The present invention relates to a method and associated apparatus for supporting multiple ring networks in a single network element.

In one embodiment, a network element is coupled to receive frames from multiple ring networks. Each ring network linked to the network element is supported by a designated support program (e.g., software task). The support programs are isolated from one another, and run concurrently. The received frames are monitored for conditions indicative of a failure in one of the ring networks. Upon detection of a failure condition, the designated support program for the failing ring network is determined and notified. The designated support program then addresses the failure condition by, for example, switching to a backup link.

In one embodiment, the frames are Synchronous Optical Network (SONET) frames.

In one embodiment, the ring networks are SONET Bidirectional Line Switched Ring (BLSR) networks.

These and other features of the present invention will be apparent to a person of ordinary skill in the art upon reading the following description and figures.

BRIEF DESCRIPTION OF THE DRAWINGS

The use of the same reference symbol in different figures indicates the same or like elements.

DETAILED DESCRIPTION

Figure 1:
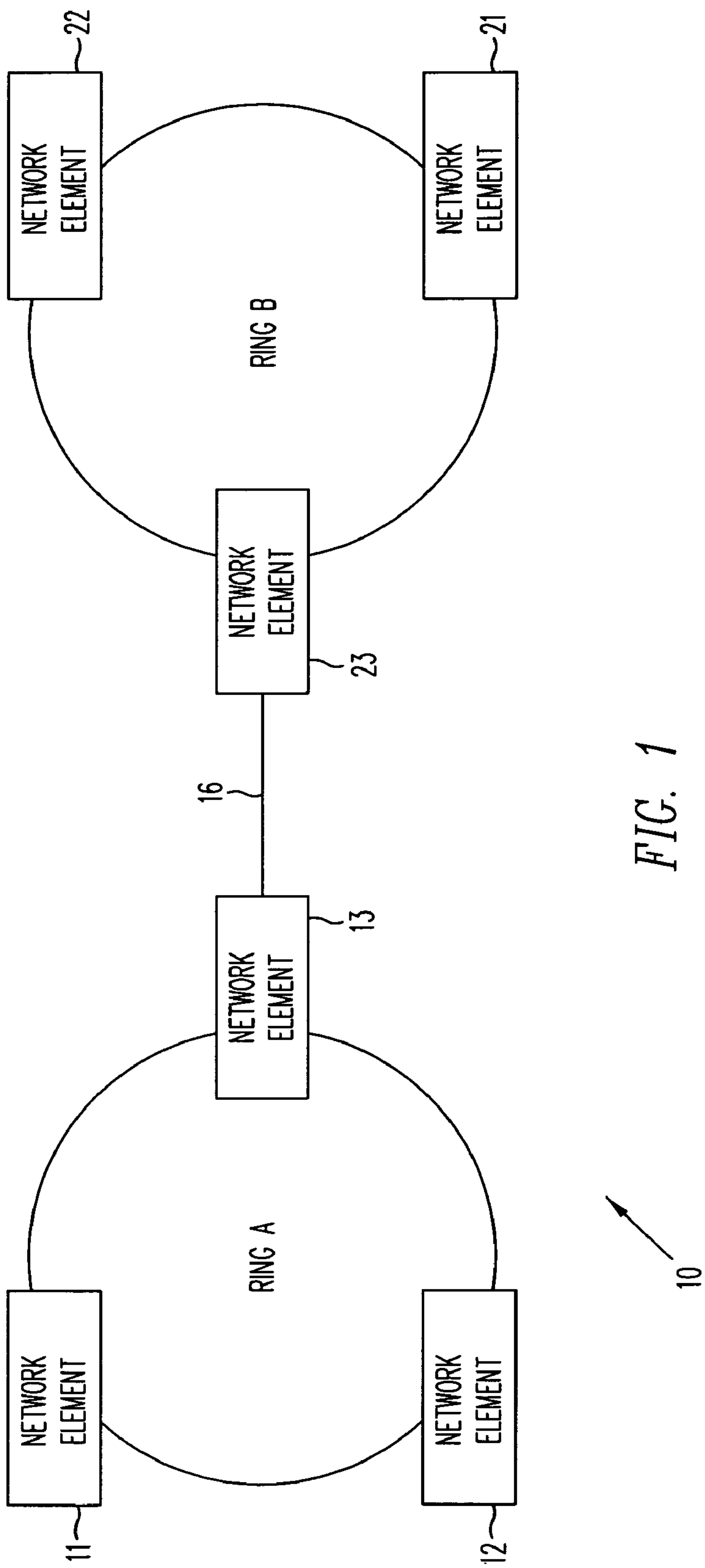
FIG. 1 shows a schematic diagram of a SONET network in the prior art.

FIG. 1 shows a schematic diagram of a SONET network 10 in the prior art. Network 10 includes ring networks RING A and RING B. Network elements (NEs) 11, 12, and 13 belong to RING A while NEs 21, 22, and 23 belong to RING B. Because none of the network elements in network 10 is capable of supporting more than one ring network, communications between network elements in different ring networks must past through NE 23 and NE 13. For example, a SONET Synchronous Transport Signal (STS) from NE 21 has to traverse NE 23 and NE 13, via link 16, to reach NE 12. Typically, link 16 is a SONET 1+1 linear link while the rest of the links coupling the network elements in RING A and RING B are SONET UPSR or BLSR links.

Figure 2:
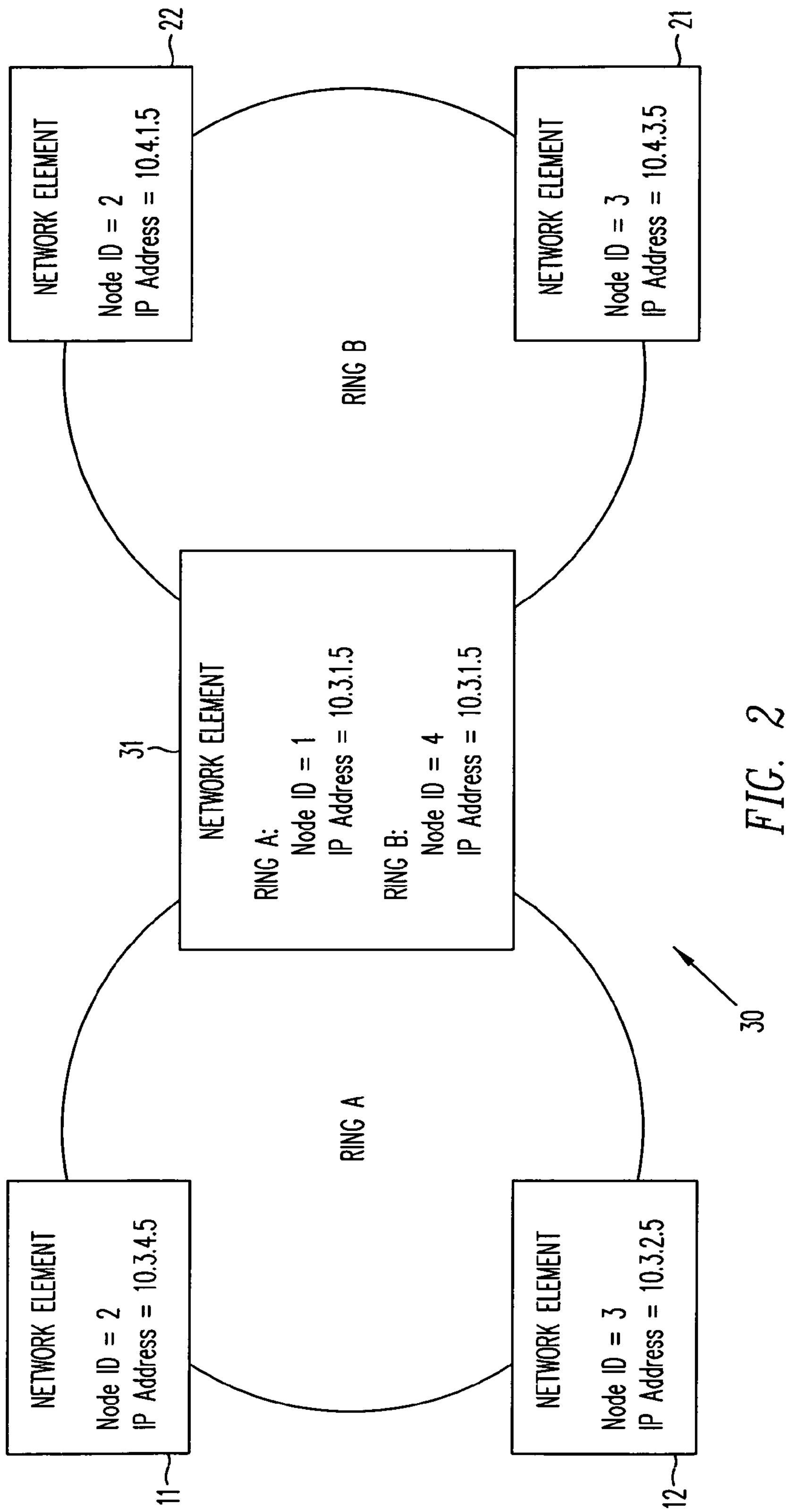
FIG. 2 shows a schematic diagram of a SONET network in one embodiment.

FIG. 2 shows a schematic diagram of a SONET network 30. Network 30 includes an NE 31, a network element that supports multiple ring networks in accordance with an embodiment of the invention. NE 31 simplifies, speeds up, and reduces the cost of network 30 by eliminating the need to provide a separate link (e.g., link 16) between RING A and RING B. Further, NE 31 provides the functionality of two network elements, which are NE 13 and 23 in this example.

Figure 3A:
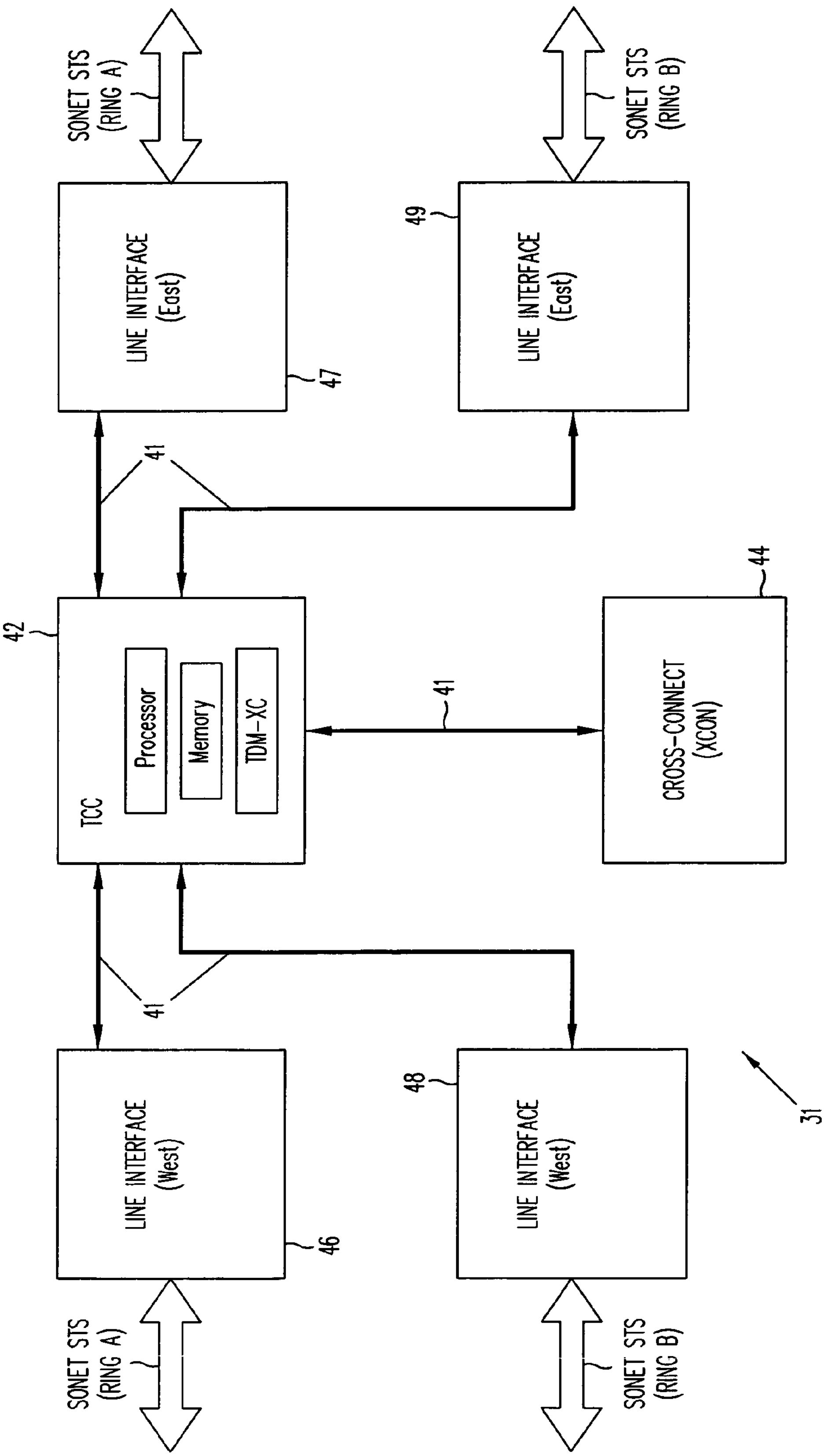
FIG. 3A shows a schematic diagram of a network element in one embodiment.

FIG. 3A shows a schematic diagram of the pertinent components of NE 31. In one embodiment, NE 31 is of the same type as the Model ONS 15454 optical transport system from Cisco Systems, Inc. NE 31 can also be of the same type as the network elements disclosed in the following commonly-owned U.S. patent applications which are incorporated herein by reference in their entirety: U.S. patent application Ser. No. 09/343,122, entitled "GENERATION OF DATA USED FOR NETWORK OPERATION," filed on Jun. 29, 1999; U.S. patent application Ser. No. 09/478,287, entitled "AUTOMATIC PROPAGATION OF CIRCUIT INFORMATION USED IN A COMMUNICATION NET- WORK", filed on Jan. 5, 2000; and U.S. patent application Ser. No. 09/274,078, "FLEXIBLE CROSS-CONNECT WITH DATA PLANE," filed on Mar. 22, 1999. A person of ordinary skill in the art can appreciate that the present technique for supporting multiple ring networks in a single network element can also be adapted to work with other types of network elements.

As illustrated in FIG. 3A, NE 31, in one embodiment, includes line interfaces 46–49 for sending and receiving SONET STSs (i.e. SONET frames) via conventional SONET links (e.g., two-fiber or four-fiber SONET links; not shown). Interfaces 46 and 47 are linked to ring network RING A while interfaces 48 and 49 are linked to ring network RING B. NE 31 can support additional ring networks by including additional pairs of interfaces.

Figure 3B:
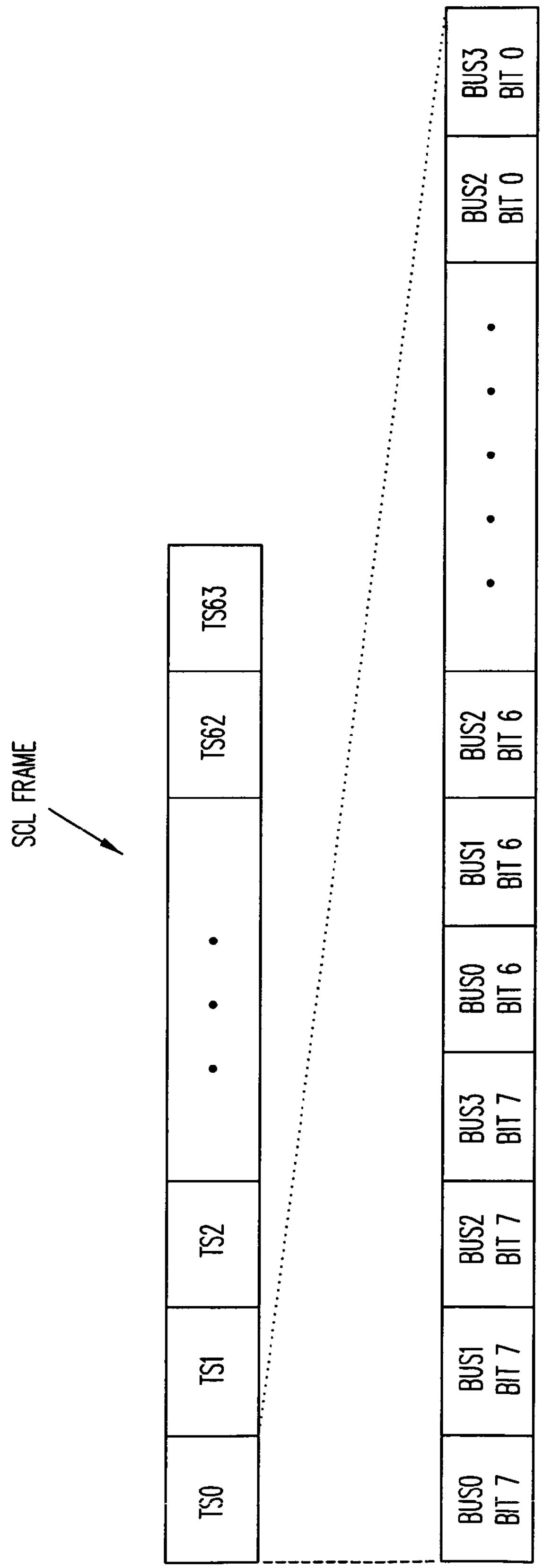
FIG. 3B pictorially illustrates the arrangement of information in a system communications link in one embodiment.

Interfaces 46–49, Timing Communications and Control (TCC) card 42, and Cross-Connect (XCON) card 44 communicate with each other by way of system communications links (SCLs) 41, which provide time division multiplexed (TDM) point-to-point connections. Time division multiplexing, in general, is well known. FIG. 3B shows a pictorial representation of the arrangement of information in a frame of an SCL 41. As shown in FIG. 3B, each frame of an SCL 41 contains 64 time slots (TS0, TS1, . . . TS63), with each time slot consisting of 32 bits. In one example, each SCL 41 uses an 8 KHZ framing clock, which results in TS0 through TS63 lasting for 125 $\mu$s (i.e., 1/8 KHz=125 $\mu$s). Each time slot carries a single byte of each of four logical buses which are BUS0, BUS1, BUS2, and BUS3. For example, the 32 bits of TS0 consist of Bit 7 of BUS0, Bit 7 of BUS1, Bit 7 of BUS2, Bit 7 of BUS3, Bit 6 of BUS0 . . . Bit 0 of BUS3; TS1 contains another byte of each of the four logical buses, and so on. Thus, essentially, each logical bus consists of 64 bytes carried in 64 different time slots. Each byte of each logical bus is designated to contain a specific type of information. For example, an overhead byte of a SONET STS received by interface 46 can be sent to TCC card 42 using the byte of logical bus BUS1 in time slot TS12 of the SCL 41 between interface 46 and TCC card 42.

TCC card 42 is an electronic printed circuit board containing a processor for running software, memory for storing software and associated data, and a TDM cross-connect (TDM-XC) for relocating time slots from one SCL 41 to another. The TDM-XC uses the well known sequential-write, random-read cross-connect technique. The so-called K1 and K2 bytes ("K-bytes") from the overhead section of the SONET STSs received on interfaces 46–69 are routed to the TDM-XC and then passed to XCON card 44. XCON card 44 is a full crosspoint, non-blocking cross-connect that supports broadcast switching. SONET cross-connects, in general, are well known. XCON card 44 cross-connects a SONET STS from one line interface to another. Thus, a SONET STS received by NE 31 from a network element in one ring network can be transmitted to another network element in another ring network. However, the capability to cross-connect a SONET STS from one line interface to another is not enough to support multiple ring networks in a single network element. What is further required, and lacking in the prior art, is the capability to process in a single network element switch requests from multiple ring networks.

Figure 4:
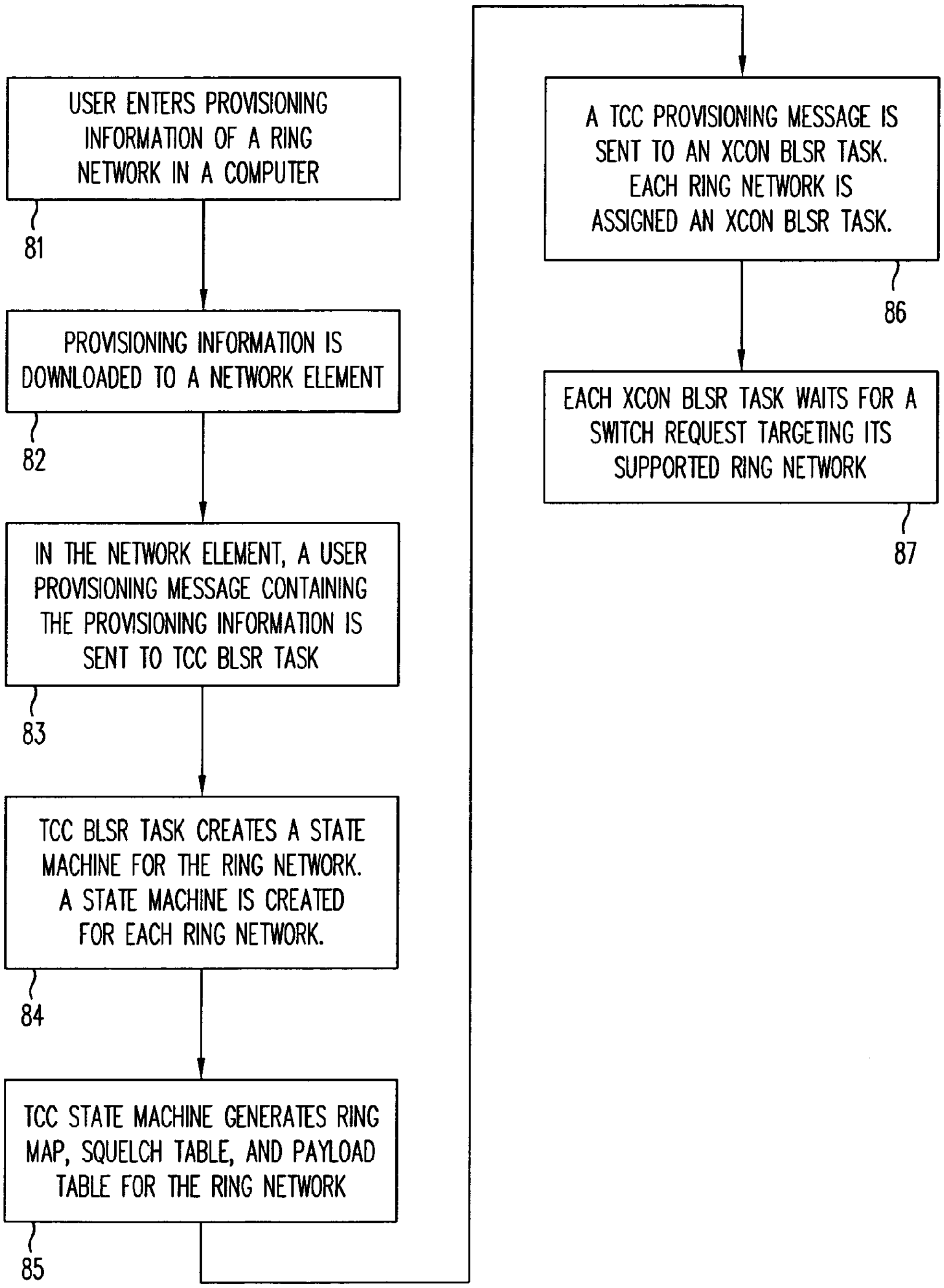
FIG. 4 shows a process for supporting multiple ring networks in one embodiment.

FIG. 4 shows a process for supporting multiple ring networks in a single network element in one embodiment. As can be appreciated by a person of ordinary skill in the art, the process shown in FIG. 4 and all other processes in this disclosure can be stored in computer-readable media such as floppy disks, hard disks, CD-ROMs, and memory devices.

In action 81, a human user provisions a ring network coupled to NE 31 by assigning, among other parameters, a Ring Id to identify the ring network, a Node ID to identify NE 31 in the ring network, and a pair of interfaces (an east interface and a west interface) linked to the ring network. The aforementioned provisioning information is entered by the user into a computer (not shown).

In action 82, the provisioning information is conventionally downloaded to NE 31. In one embodiment, the data-entry computer communicates with NE 31 using conventional CORBA (Common Object Request Brokerage Architecture) calls over a TCP/IP connection (e.g., Ethernet). The CORBA calls cause a user provisioning message to be sent to a ring network software task running in TCC card 42. In one embodiment, ring networks RING A and RING B are both BLSR rings and the ring network software task running in TCC card 42 is a BLSR task (hereinafter "TCC BLSR task").

In action 83, the TCC BLSR task receives the user provisioning message, which includes a BLSR provisioning table containing the provisioning information entered by the user.

TABLE 1

EXAMPLE BLSR PROVISIONING TABLE FOR NE 31

| Ring Index No. | Ring ID | Node ID | West Interface No. | East Interface No. |
|---|---|---|---|---|
| 0 | 0 | 1 | 46 | 47 |
| 1 | 1 | 4 | 48 | 49 |
| 2 | x | 255 | x | x |
| 3 | x | 255 | x | x |
| 4 | x | 255 | x | x |

Table 1 shows an example BLSR provisioning table. In the example of Table 1, ring network RING A is assigned a Ring ID of "0" and is linked to NE 31 via interfaces 46 and 47. The Node ID of NE 31 in RING A is "1". Similarly, RING B is assigned a Ring ID of "1" and is linked to NE 31 via interfaces 48 and 49. The Node ID of NE 31 in RING B is "4".

A Ring Index No., which is internal to NE 31, is also assigned to each provisioned ring network so that the ring network can be uniquely identified across all software running in NE 31. In one example, the Ring Index No. is assigned based on the ring network's row number in the BLSR provisioning table. Thus, the Ring Index No. of RING A is "0" because RING A's provisioning information is in the first row of Table 1. Similarly, the Ring Index No. of RING B is "1" because RING B's provisioning information is in the second row. In Table 1, a node ID of 255 indicates that the row is unused, and an "x" in any of the cells indicates a "don't care."

In action 84, the TCC BLSR task creates a state machine (hereinafter "TCC state machine") for each new and valid ring network identified in the BLSR provisioning table (e.g., two ring networks require two TCC state machines). In one example, a valid ring network has a Node ID between 0 and 31.

In action 85, each TCC state machine generates a ring map, a squelch table, and a payload table for its corresponding ring network. An example pseudo-code of the TCC state machine is shown in APPENDIX A, which is an integral part of this disclosure. The ring map, squelch table, and payload table for a ring network can also be generated using the technique described in the incorporated and commonly-owned disclosure U.S. patent application Ser. No. 09/343,122, entitled "GENERATION OF DATA USED FOR NETWORK OPERATION".

The ring map contains the IP (Internet Protocol) address and the Node ID of each network element in the ring network. The topology of the ring network, which includes such information as the Node ID and IP address of each network element in the ring, can be automatically detected using the techniques described in the incorporated and commonly-owned disclosures U.S. patent application Ser. No. 09/478,287, entitled "AUTOMATIC PROPAGATION OF CIRCUIT INFORMATION USED IN A COMMUNICATION NETWORK" and U.S. patent application Ser. No. 09/343,122, entitled "GENERATION OF DATA USED FOR NETWORK OPERATION". Table 2 shows a ring map for RING A using network 30 (FIG. 2) as an example. Similarly, the ring map for RING B is shown in Table 3.

TABLE 2

EXAMPLE RING MAP FOR RING A OF NETWORK 30

| IP Address | Node ID |
|---|---|
| 10.3.1.5 | 1 |
| 10.3.2.5 | 3 |
| 10.3.4.5 | 2 |

TABLE 3

EXAMPLE RING MAP FOR RING B OF NETWORK 30

| IP Address | Node ID |
|---|---|
| 10.4.1.5 | 2 |
| 10.4.3.5 | 3 |
| 10.3.1.5 | 4 |

As shown in Table 2, NE 31 has an IP address of "10.3.1.5" in both RING A and RING B (see also FIG. 2). While the Node ID of NE 31 is "1" in RING A and "4" in RING B, NE 31 can also have the same Node ID in both RING A and RING B as long as the Node ID is unique in both ring networks.

The squelch table contains information indicating where in the ring network a particular SONET STS is added and dropped. Table 4 and Table 5 show example squelch tables for RING A and RING B of network 30 (FIG. 2), respectively.

TABLE 4

EXAMPLE SQUELCH TABLE FOR RING A OF NETWORK 30

| | West (Intf 46) | | East (Intf 47) | |
|---|---|---|---|---|
| STS | Incoming | Outgoing | Incoming | Outgoing |
| 1 | Node 3 | Node 3 | Node 3 | Node 2 |
| 2 | Node 3 | — | Node 2 | Node 3 |
| 3 | — | Node 1 | Node 1 | — |

TABLE 5

EXAMPLE SQUELCH TABLE FOR RING B OF NETWORK 30

| STS | West (Intf 48) | | East (Intf 49) | |
|---|---|---|---|---|
| No. | Incoming | Outgoing | Incoming | Outgoing |
| 1 | Node 4 | — | — | Node 4 |
| 2 | Node 2 | — | Node 3 | — |
| 3 | Node 3 | Node 2 | — | — |

In the example of Table 4, STS No. 1 received on interface 46 of NE 31 is added on Node 3 of RING A (i.e., NE 12) while the STS No. 1 leaving interface 46 is dropped on Node 3 of RING A. Thus, the STS No. 1 on interface 46 is a bi-directional STS between NE 12 and NE 31. Table 4 also shows that the STS No. 2 received on interface 47 is added on Node 2 (i.e., NE 11) while the STS No. 2 leaving interface 47 is dropped on Node 3. Further, Table 4 shows that the STS No. 3 leaving interface 46 is dropped on Node 1 (i.e., NE 31). This is an example of a unidirectional STS. Correspondingly, the STS No. 3 received on interface 47 is added on Node 1 (i.e., NE 31). In Tables 4 and 5, blank cells indicate an unequipped STS.

The payload table contains information indicating the type of each SONET STS (e.g., STS-1, STS-3C, STS-12C or UNEQUIPPED) in the ring network. Table 6 shows an example payload table for NE 31 in RING A. In Table 6, the columns "West" and "East" refer to the pair of line interfaces used by each network element in the ring network. Each interface supports three SONET STSs in this example.

TABLE 6

EXAMPLE PAYLOAD TABLE OF NE 31 ON RING A

| Node ID | STS No. | West | East |
|---|---|---|---|
| 1 | 1 | STS-1 | STS-3C |
| 1 | 2 | STS-1 | STS-3C |
| 1 | 3 | STS-1 | STS-3C |
| 2 | 1 | STS-1 | STS-1 |
| 2 | 2 | STS-1 | STS-1 |
| 2 | 3 | STS-1 | STS-1 |
| 3 | 1 | STS-3C | STS-3C |
| 3 | 2 | STS-3C | STS-3C |
| 3 | 3 | STS-3C | STS-3C |

As shown in Table 6, STS No. 1 of Node 1 (i.e., NE 31) on the west interface (i.e., interface 46) is an STS-1, STS No. 1 of Node 1 on the east interface (i.e., interface 47) is an STS-3C, and so on. Similarly, NE 31 has a payload table (not shown) indicating the type of each SONET STS in RING B.

The ring map, squelch table, and payload table describe the interconnection of network elements and flow of SONET STSs in a particular ring network. Thus, in the event of a link failure, the SONET STSs can be re-routed to protection links in accordance with the well known Automatic Protection Switching protocol (APS) (see also, Bellcore document Generic Requirements GR-1230-CORE (Issue 4, December 1998), incorporated herein by reference).

Every time a user provisioning message is received by the TCC BLSR task, the accompanying BLSR provisioning table is compared against those previously received. This allows the TCC BLSR task to determine if a new ring network is being provisioned, if an existing ring network is being modified, or if an existing ring network is being deprovisioned (i.e., removed). To simplify the comparison process, a ring network always appears in the same row of the BLSR provisioning table. In one example, the following algorithm is followed when a new provisioning table is received:

a) If row i of the new provisioning table is invalid (e.g., has a Node ID of "255") and row i of the old provisioning table is also invalid, then nothing has to be done.

b) If row i of the new provisioning table is invalid but row i of the old provisioning table is valid (i.e., has a Node ID between 0 and 31), the ring network in row i of the old provisioning table is being deprovisioned. In this case, the corresponding TCC state machine for the deprovisioned ring network releases all memory used for data structures before being destroyed.

c) If row i of the new provisioning table is valid but row i of the old provisioning table is invalid, a new ring network is being provisioned. In this case, a new TCC state machine is created for the new ring.

d) If row i of the new provisioning table is valid and row i of the old provisioning table is also valid, the ring network identified in row i might have been modified. In this case, the contents of row i of the old and new provisioning tables are examined to determine what was modified. Then:

i) If the link connecting an interface of NE 31 to the ring is being changed from a two-fiber to a four-fiber link or vice versa, the corresponding old TCC state machine is destroyed and replaced with a new TCC state machine.

ii) Any other changes are forwarded to the corresponding old TCC state machine for appropriate action. The incorporated and commonly-owned U.S. patent application Ser. No. 09/343,122, entitled "GENERATION OF DATA USED FOR NETWORK OPERATION" discusses some actions that are performed upon notification of modifications affecting the ring; also, see APPENDIX A in this disclosure.

In action 86 (FIG. 4), a TCC provisioning message is sent from TCC card 42 to other cards in NE 31 including XCON card 44. The TCC provisioning message includes the ring map, squelch table, and payload table generated by the TCC state machine of the newly provisioned ring network. Also in the TCC provisioning message are the ring network's Ring Index No., the Node ID of NE 31 in the ring network, and the interfaces of NE 31 (east interface and west interface) linked to the ring network. In XCON card 44, the TCC provisioning message is received by an XCON BLSR task. One XCON BLSR task supports one ring network.

In action 87 (FIG. 4), each XCON BLSR task waits for a switch request intended for the supported ring network. Processing of switch requests is later described below with reference to FIGS. 5A and 5B.

Because the XCON BLSR tasks are isolated from one another in order to support multiple ring networks, the software variables used by the XCON BLSR tasks are uniquely identified by the Ring Index No. of their supported rings. For example, to access the ring map of each of the supported rings, an array of five (5) ring maps can be statically declared as tRingMap ringMap[5], which could then be used as ringMap[ringIdx], where ringIdx is the Ring Index No. of the supported ring network. The ring map of the ring network with a Ring Index No. of "0" can then be accessed using the variable ringMap [0], the ring map of the ring network with a Ring Index No. of "1" can be accessed using the variable ringMap[1], and so on.

In one example, NE 31 uses a multi-tasking operating system such as the VxWorks Operating system from Wind River Systems, Inc. to allow software tasks in NE 31 (including the XCON BLSR tasks) to run concurrently.

In one example, each XCON BLSR task has three conventional software pipes (e.g., UNIX pipe) for communicating with other tasks: (i) a user command pipe, (ii) a pipe for receiving messages from an interrupt service routine, and (iii) a timer pipe. Each pipe, like the variables used by the XCON BLSR tasks, is also identified by the Ring Index No. of its supported ring network.

User commands, such as manual switch requests, are passed to an XCON BLSR task via the user command pipe. For example, a user command intended for the XCON BLSR task supporting RING B is passed to the user command pipe with a Ring Index No. of "1" (which is the Ring Index No. of RING B; see Table 1).

A software timer communicates with an XCON BLSR task using the timer pipe. For example, the software timer can inform the XCON BLSR task supporting RING A that a particular period of time has elapsed by passing a message to the timer pipe with a Ring Index No. of "0" (which is the Ring Index No. of RING A; see Table 1).

Once the XCON BLSR task of the newly provisioned ring network is initialized, the TCC BLSR task queries other network elements in the ring network to see if they are ready to send and receive SONET STSs. If so, the XCON BLSR task is enabled to recognize the new ring network.

As is well known, the Automatic Protection Switching (APS) protocol uses the so-called K-bytes of a SONET STS overhead to convey switching commands and error conditions. For example, a network element requesting a re-route of SONET STSs because of a locally detected link failure coordinates the switchover to a protection link using the K-bytes. In NE 31 (FIG. 3A), K-bytes are stripped by line interfaces 46–49 from the overhead section of received SONET STSs, and are placed in designated time slots of SCLs 41 for transmission to XCON card 44. There, newly received K-bytes are compared against previously received K-bytes. An interrupt is generated when the new K-bytes are different from the old K-bytes.

An interrupt is also generated when line interfaces 46–49 locally detect link related problems such as signal degradation, signal failure, and loss of frame. Link related problems can be locally detected using hardware or software techniques that are well known to a person of ordinary skill in the art. The locally detected link conditions are placed by line interfaces 46–49 in designated high priority time slots of SCLs 41, referred to as BSR (bi-switched ring) bytes, for transmission to XCON card 44. An interrupt is generated when the new and old BSR bytes are different.

Figure 5A:
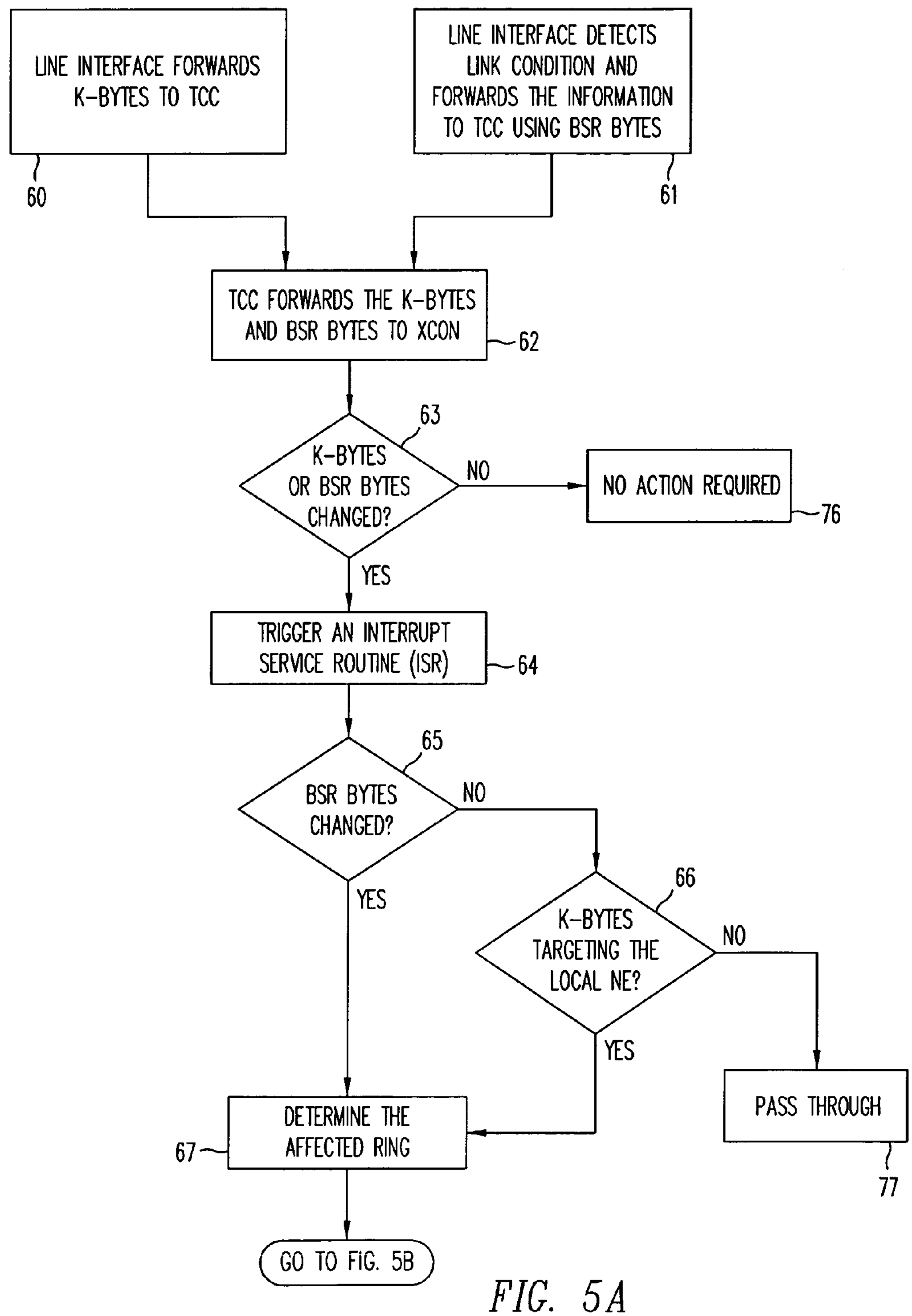
FIGS. 5A and 5B show a process for handling switching requests in one embodiment.
Figure 5B:
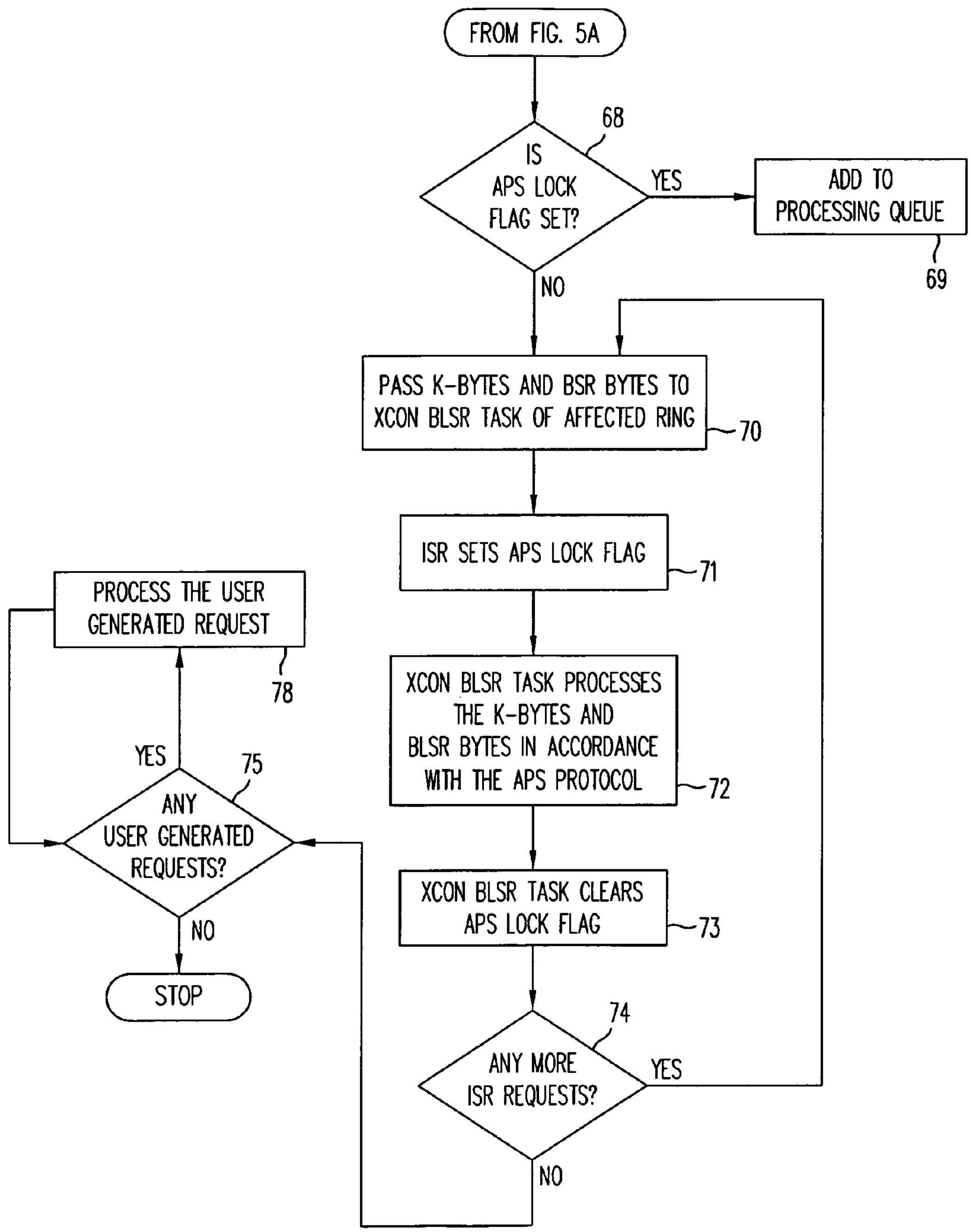

FIGS. 5A and 5B illustrate an example process for handling switching requests in NE 31. Of course, the just mentioned process can also be adapted to work in other types of network elements. In action 60, line interface cards 46–49 strip the K-bytes of received SONET STSs for transmission to TCC card 42 via SCLs 41 (shown in FIG. 3A). Locally detected link conditions are also sent to TCC card 42 using the BSR bytes time slots of SCLs 41 (action 61). From TCC card 42, the K-bytes and BSR bytes are forwarded to XCON card 44 via the SCL 41 linking the two cards (action 62). In XCON card 44, the newly received K-bytes and BSR bytes are compared against those previously received (action 63). If either the K-bytes or the BSR bytes have changed, an interrupt service routine (ISR) is triggered (action 64). Otherwise, no action is required (action 76). The triggered ISR determines whether the BSR bytes have changed (action 65). If the BSR bytes have not changed, the interrupt must have been generated in response to a K-byte change. In that case, the ISR examines the K-bytes to determine if the change is directed to NE 31 (action 66). If not, the ISR ignores the K-bytes, which are then passed through NE 31 without being processed (action 77). If the K-bytes change are directed to NE 31 or if the BSR bytes have changed, the ISR determines which ring network is affected (action 67).

As previously discussed, each time slot of each SCL 41 is designated to carry a particular type of information. By storing the type of information carried by each time slot in a look-up table (e.g., map, memory, database), the ring network affected by the K-byte or BSR byte change can be readily determined by the ISR. For example:

(i) if the byte of logical bus BUS0 in time slot TS5 of the SCL 41 between interface 46 and TCC card 42 is designated to carry a K-byte received by interface 46; and (ii) if the byte of logical bus BUS1 in time slot TS7 of the SCL 41 between TCC card 42 and XCON card 44 is designated to carry the byte of logical bus BUS0 in time slot TS5 of the SCL 41 between interface 46 and TCC card 42; then (iii) the byte of logical bus BUS1 in time slot TS7 of the SCL 41 between TCC card 42 and XCON card 44 affects RING A (because interface 46 is linked to RING A).

The design of a look-up table mapping the SCL 41 time slots, the K-bytes and BSR bytes, the interfaces, the ring networks coupled to the interfaces, and the Ring Index No. of each ring network is well within the capability of a person skilled in the art.

Once the affected ring network is determined, the ISR checks the APS Lock flag of the XCON BLSR task supporting the affected ring network to determine if the XCON BLSR task is busy processing other switch requests (action 68, FIG. 5B). In this example, an APS Lock flag is used to prevent different switch requests from simultaneously changing the switching configuration of XCON card 44. When the APS Lock flag is set, new switch requests are added to the processing queue (action 69) and wait until the previous requests are fully processed. Otherwise, the ISR passes the K-bytes and BSR-bytes to the XCON BLSR task supporting the affected ring network via the ring network's ISR pipe (action 70). The ISR then sets the APS Lock flag of the XCON BLSR task (action 71).

The XCON BLSR task processes the K-bytes and BSR bytes in accordance with the APS protocol (action 72) and, upon completion, clears the APS Lock flag (action 73). Actions 70–73 are repeated for each switch request pending in the processing queue (action 74). If there are no pending switch requests, the XCON BLSR task checks if there are user generated requests (action 75). User generated requests are administrative switch requests made, for example, to perform an equipment maintenance card swap or to change the switching configuration of XCON card 44 to add/remove customers. User generated requests are passed to the XCON BLSR task using the user command pipe identified by the Ring Index No. of the affected ring. User generated requests are conventionally processed (action 78) by reconfiguring the switch matrix of XCON card 44.

While specific embodiments of this invention have been described, it is to be understood that these embodiments are illustrative and not limiting. For example, the present invention can be used in a variety of ring topology networks including Synchronous Digital Hierarchy (SDH) networks. Many additional embodiments that are within the broad principles of this invention will be apparent to persons skilled in the art.

What is claimed is:

1. A method comprising:

(a) receiving frames from a plurality of ring networks at a single network element;

(b) monitoring said frames at a single network element for a condition indicative of a failure in one of said plurality of ring networks;

(c) detecting a failure in one of said plurality of ring networks, wherein said detecting said failure comprises reading a portion of a first frame;

(d) determining which ring network among said plurality of ring networks is failing, wherein a first one of said ring networks is said failing ring network;

(e) providing said portion of said first frame to a first one of a plurality of tasks, in response to said determining, wherein said first one of the plurality of tasks corresponds to said first one of said ring networks, and said frame is received from said first one of said ring networks;

(f) providing a portion of a second frame to a second one of a plurality of tasks, in response to determining that a second one of said ring networks is failing, wherein said second one of the plurality of tasks corresponds to said second one of said ring networks, and said second frame is received from said second one of said ring networks; and (g) rerouting frames of the first one of said ring networks in response to detecting that said first ring network is a failing ring network, wherein said rerouting is performed by said first one of said tasks.

2. The method of claim 1 wherein said portion of said first frame is an overhead section of a Synchronous Optical Network (SONET) Synchronous Transport Signal (STS).

3. The method of claim 2 wherein said portion of said first frame includes K-Bytes of the SONET STS.

4. The method of claim 3 wherein the act of rerouting frames is in accordance with Automatic Protection Switching (APS) protocol.

5. The method of claim 1 wherein said plurality of ring networks are Synchronous Optical Network (SONET) Bidirectional Line Switched Ring (BLSR) networks.

6. A network element comprising:

a first line interface of said network element coupled to a first ring network;

a second line interface of said network element coupled to a second ring network;

a cross-connect device of said network element, said cross-connect device including a computer program for monitoring information from said first ring network and said second ring network;

wherein said computer program monitors said information for conditions indicative of a failure in said first ring network or said second ring network, wherein said cross-connect device further implements a plurality of tasks, wherein a first one of said tasks is configured to reroute frames of said first ring network in response to said computer program detecting a failure in said first ring network, and a second one of said tasks is configured to reroute frames of said second ring network in response to said computer program detecting a failure in said second ring network.

7. The network element of claim 6 wherein said first ring network and said second ring network are Synchronous Optical Network (SONET) Bidirectional Line Switched Ring (BLSR) networks.

8. A network element comprising:

a processor;

a plurality of network interfaces, each of said network interfaces coupled to one of a plurality of ring networks and to said processor;

computer readable medium coupled to said processor; and computer code, encoded in said computer readable medium, configured to cause said processor to:

receive frames from said plurality of ring networks;

monitor said frames for a condition indicative of a failure in one of said plurality of ring networks;

detect a failure in one of said plurality of ring networks, wherein said detecting said failure comprises reading a portion of a first frame;

determine which ring network among said plurality of ring networks is failing wherein a first one of said ring networks is said failing ring network;

provide said portion of said first frame to a first one of a plurality of tasks, in response to said determining, wherein said first one of the plurality of tasks corresponds to said first one of said ring networks, and said frame is received from said first one of said ring networks;

provide a portion of a second frame to a second one of a plurality of tasks, in response to determining that a second one of said ring networks is failing, wherein said second one of the plurality of tasks corresponds to said second one of said ring networks, and said second frame is received from said second one of said ring networks; and reroute frames of said first one of said ring networks in response to detecting that said first ring network is a failing ring network, wherein said rerouting is performed by said first one of said tasks.

9. The network element of claim 8, wherein said portion of said first frame is an overhead section of a Synchronous Optical Network (SONET) Synchronous Transport Signal (STS).

10. The network element of claim 9, wherein said portion of said first frame includes K-Bytes of the SONET STS.

11. The network element of claim 10, wherein computer code configured to cause said processor to reroute frames of said failing ring network is further configured to cause said processor to reroute frames of said failing ring network in accordance with Automatic Protection Switching (APS) protocol.

12. The network element of claim 11, wherein said plurality of ring networks are Synchronous Optical Network (SONET) Bidirectional Line Switched Ring (BLSR) networks.

13. A computer program product comprising:

a first set of instructions, executable on a computer system, configured to cause a single network element to receive frames from a plurality of ring networks;

a second set of instructions, executable on said computer system, configured to monitor said frames for a condition indicative of a failure in one of said plurality of ring networks;

a third set of instructions, executable on said computer system, configured to detect a failure in one of said plurality of ring networks, wherein said detecting said failure comprises reading a portion of a first frame;

a fourth set of instructions, executable on said computer system, configured to determine which ring network among said plurality of ring networks is failing, wherein a first one of said ring networks is said failing ring network;

a fifth set of instructions, executable on said computer system, configured to provide said portion of said first frame to a first one of a plurality of tasks, in response to said determining, wherein said first one of the plurality of tasks corresponds to said first one of said ring networks, said frame is received from said first one of said ring networks;

said fifth set of instructions are further configured to provide a portion of a second frame to a second one of a plurality of tasks, in response to determining that a second one of said ring networks is failing, said second one of the plurality of tasks corresponds to said second one of said ring networks, and said second frame is received from said second one of said ring networks; and a sixth set of instructions, executable on said computer system, configured to reroute frames of said first one of said ring networks in response to detecting that said first ring network is a failing ring network, wherein said sixth set of instructions are executable to implement said first one of said tasks; and computer readable media, wherein said computer program product is encoded in said computer readable media.

14. The computer program product of claim 13, wherein said portion of said first frame is an overhead section of a Synchronous Optical Network (SONET) Synchronous Transport Signal (STS).

15. The computer program product of claim 14, wherein said portion of said first frame includes K-Bytes of the SONET STS.

16. The computer program product of claim 15, wherein said fifth set of instructions is further configured to reroute frames of said failing ring network in accordance with Automatic Protection Switching (APS) protocol.

17. The computer program product of claim 16, wherein said plurality of ring networks are Synchronous Optical Network (SONET) Bidirectional Line Switched Ring (BLSR) networks.

18. A network element comprising:

means for receiving frames from a plurality of ring networks at said network element;

means for monitoring said frames for a condition indicative of a failure in one of said plurality of ring networks;

means for detecting a failure in one of said plurality of ring networks, wherein said detecting said failure comprises reading a portion of a first frame;

means for determining which ring network among said plurality of ring networks is failing, wherein
a first one of said ring networks is said failing ring network;
means for providing said portion of said first frame to a first one of a plurality of tasks, in response to determining that the first one of said ring networks is said failing ring network, wherein
said first one of the plurality of tasks corresponds to said first one of said ring networks,
said frame is received from said first one of said ring networks;
means for providing a portion of a second frame to a second one of a plurality of tasks, in response to determining that a second one of said ring networks is failing,
said second one of the plurality of tasks corresponds to said second one of said ring networks, and
said second frame is received from said second one of said ring networks; and
means for rerouting frames of said failing ring network, wherein the means for rerouting frames implement said first one of said tasks.

19. The network element of claim 18 wherein said portion of said first frame is an overhead section of a Synchronous Optical Network (SONET) Synchronous Transport Signal (STS).

20. The network element of claim 19 wherein said portion of said first frame includes K-Bytes of the SONET STS.

21. The network element of claim 20 wherein said means for rerouting frames comprises means for rerouting frames in accordance with Automatic Protection Switching (APS) protocol.

22. The network element of claim 21 wherein said plurality of ring networks are Synchronous Optical Network (SONET) Bidirectional Line Switched Ring (BLSR) networks.

23. The method of claim 1, further comprising:
receiving provisioning information, wherein
said provisioning information comprises information identifying components of each of said ring networks; and
initiating a state machine for each ring network identified in said provisioning information.

24. The method of claim 23, further comprising:
generating a first ring map for said first one of said ring networks, wherein
said generating is performed by a first state machine,
said first state machine is associated with said first one of said ring networks, and
said first ring map comprises a network address and a node ID of each network element included in said first one of said ring networks.

25. The method of claim 24, further comprising:
generating a first squelch table for said first one of the ring networks, wherein
said generating is performed by said first state machine,
said first squelch table comprises information indicating where a particular Synchronous Optical Network (SONET) Synchronous Transport Signal (STS) is added within said first one of said ring networks, and
said first squelch table comprises information indicating where said particular SONET STS is dropped within said first one of said ring networks.

26. The method of claim 25, further comprising:
generating a first payload table for said first one of said ring networks, wherein
said generating is performed by said first state machine, and
said first payload table comprises information indicating a type of each SONET STS in said first one of said ring networks.

27. The method of claim 26, further comprising:
determining whether a new ring network is being provisioned, based on said provisioning information.

28. The method of claim 26, further comprising:
sending said first ring table, said first squelch table, and said first payload table to said first one of said tasks.

29. The method of claim 1, wherein said determining which ring network among said plurality of ring networks is failing comprises:
receiving said portion of said first frame in a first time slot of a plurality of time slots, wherein
said portion of said first frame is conveyed in the first time slot via a system communication link coupling a timing communications and control card and a cross-connect card; and
accessing mapping information, wherein the mapping information identifies that information corresponding to the first one of said ring networks is conveyed in said first time slot.

* * * * *